Patented Oct. 3, 1939

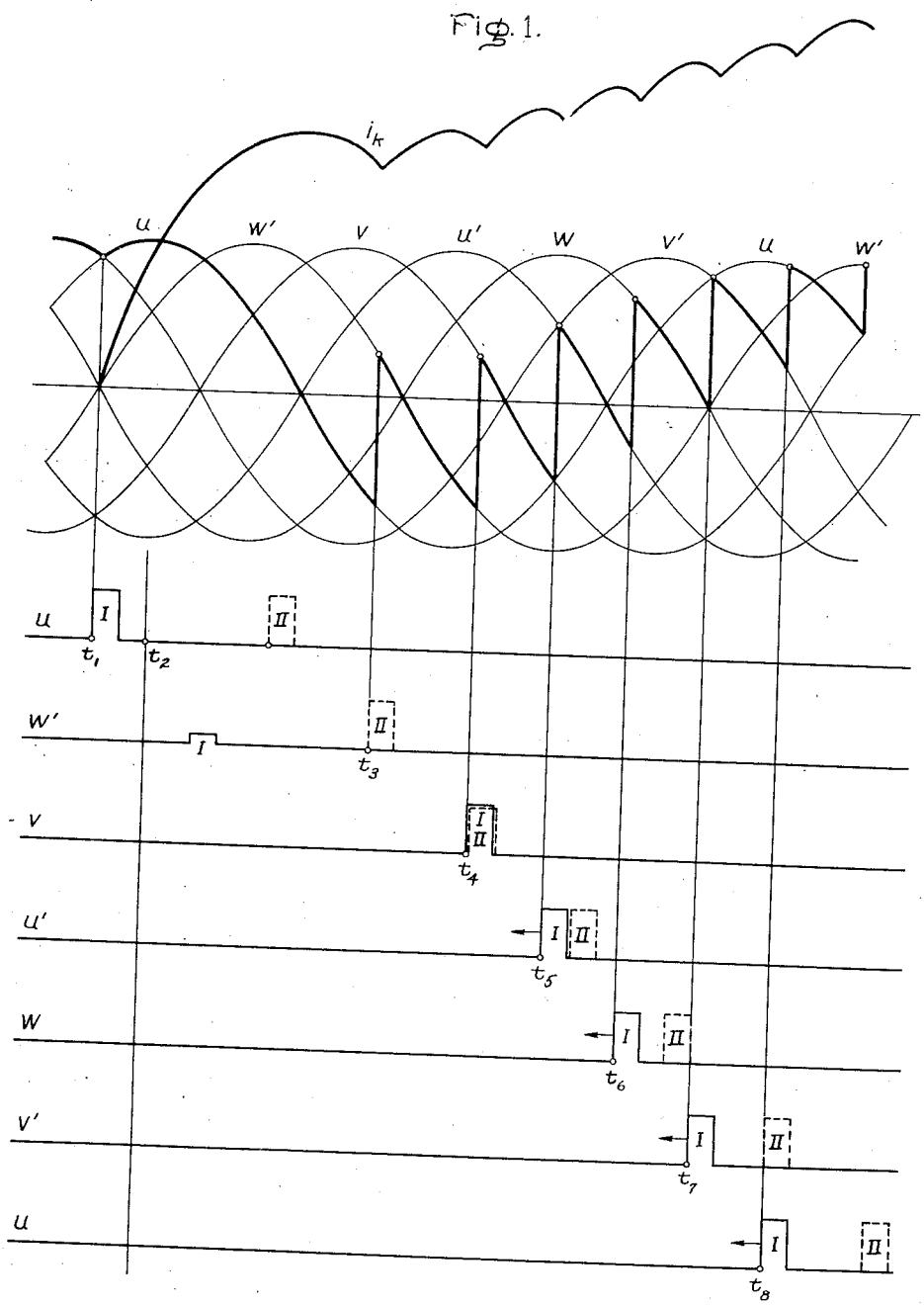

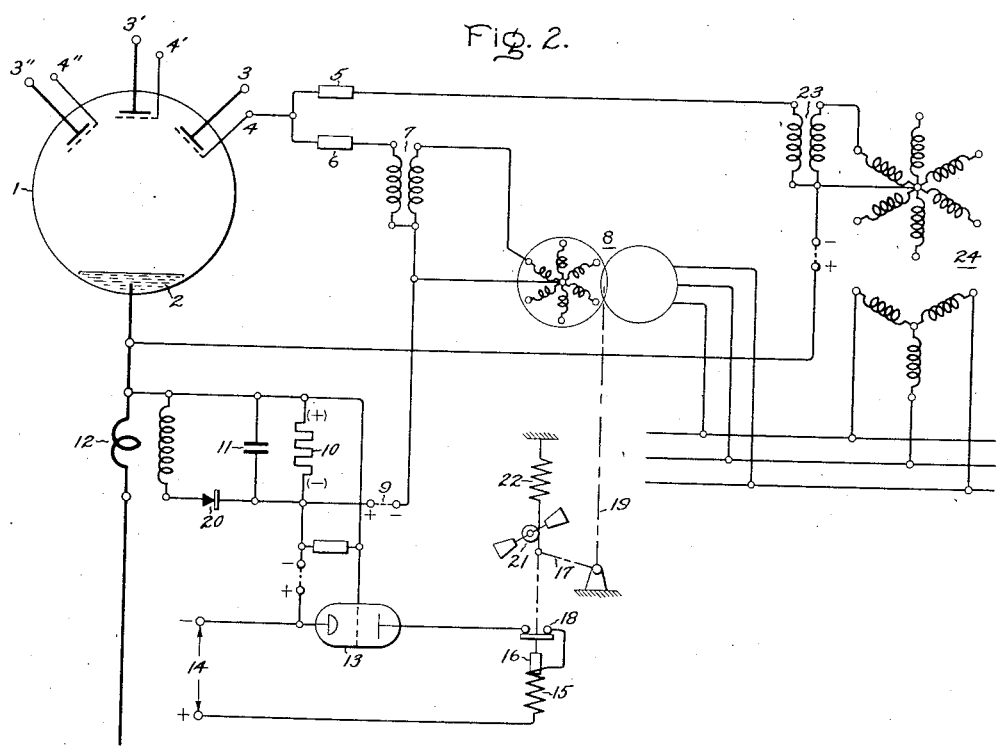

2,175,020

UNITED STATES PATENT OFFICE 2,175,020

PROTECTIVE ARRANGEMENT FOR ELECTRIC VALVE CONVERTING SYSTEMS

Claus Fröhmer, Berlin-Siemensstadt, Germany, assignor to General Electric Company, a corporation of New York Application July 17, 1936, Serial No. 91,193
In Germany July 27, 1935

6 Claims. (Cl. 175—363)

The switching-off of short-circuits in continuous-current networks fed by grid-controlled rectifiers by means of the grid-control entails the drawback that owing to the high speed with which that switching-off takes place the circuit breaker of that section in which the short-circuit has arisen frequently remains closed so that when the rectifier becomes conductive it is again switched-on on the short-circuit, in consequence whereof it must instantly again be withdrawn from service. In view thereof it has been proposed to abstain from switching-off the rectifier when short-circuits occur in networks fed by grid-controlled rectifiers, and to reduce the continuous potential supplied by the rectifier by means of the grid-control to a value at which the circuit breaker of the short-circuited section will operate. It also has been proposed to employ for the control of the grid a sine-wave alternating potential superposed upon a continuous potential the magnitude of which is dependent upon the rate of rise of the continuous current so that when the current rises the ignition of the individual anodes is retarded. This method cannot be used, however, if the grid control potential is a periodic potential having an acute or a rectangular curve-shape.

However it is desirable to use such an alternating potential because it determines with accuracy the instant of the ignition. It seems, therefore, to be expedient to shift the phase position of such alternating potential in response to the rate of rise of the continuous current so that the individual anodes ignite at a later instant. Heretofore it was shown that a comparatively large assemblage of devices was required to obtain the necessary alteration of the phase position of the grid control alternating potential.

The present invention relates to an arrangement for the selective switching-off of short-circuits in networks fed by grid-controlled rectifiers, in which arrangement a grid control potential comprises an alternating potential of peaked or rectangular wave shape with variable phase position and an alternating potential of similar wave shape of fixed phase. In accordance with the rate of rise of the continuous current upon short circuit conditions the alternating potential with variable phase position is first rendered effective so that the anodes now ignite at a later time instant due to the grid control alternating potential having the fixed phase position. Then the phase position of that grid alternating potential which is ineffective at that time is so varied that it nearly corresponds with that alternating potential of fixed phase position. As soon as this adjustment has been made, the first-mentioned alternating potential of variable phase is again rendered effective and its phase-position is varied, preferably at such a rate and in such a manner, that the anodes gradually approach their previous ignition instants. By a suitable adjustment of the section circuit breaker or line switch and of the phase position of the grid potential of fixed phase it is possible to cause the circuit breaker of the short circuited section to operate prior to the time when the continuous potential is gradually increased by the now again effective alternating potential of variable phase position.

In order that my invention may be understood more easily, I refer to the accompanying drawings on which Figure 1 shows characteristic curves pertaining to a six-phase rectifier, and Figure 2 shows the circuit arrangement of such a rectifier embodying my invention.

Referring to Fig. 1, the curves represent the anode potentials of a six-phase rectifier as they appear along a time axis. At the time $t_1$ it is assumed that normal operation has been occurring and that all anodes were fully conductive. By means of the quadrangular grid control alternating potential I of variable phase position, the anode $u$ is ignited in this instant. Supposing, a short-circuit occurs at the time $t_2$ in the continuous-current network so that the continuous current increases. In accordance with the rate of rise or increase of the continuous current, for instance, a relay or a grid-controlled auxiliary discharge vessel with a gas or vapor filling should be so controlled that the grid alternating potential I of variable phase position is thereby rendered ineffective. In other words the height or magnitude of the positive impulses of that grid control alternating potential of variable phase position is reduced with sufficient speed, or a negative continuous potential must be superimposed on this potential.

Where such an arrangement is provided, the ignition of the anode $w'$ is not effected by the grid alternating potential I of variable phase, but it will be effected only at the time $t_3$ by the grid control alternating potential of fixed phase position. By suitably selecting the phase position of the alternating potential II of fixed phase relative to the anode potentials it is possible to provide that the current supplied by the rectifier as determined by the grid control alternating potential II whenever the network is short-circuited is of such a value as to cause positive operation of the section circuit breaker or line switch of the short-circuited section.

Successive anodes would likewise be ignited later than under normal conditions so that the short-circuit current will not exceed a certain predetermined value. As soon as the short-circuited section has been switched-off, the continuous potential should be brought to its normal value by a corresponding regulation by means of the grids. For this purpose the grid control alternating potential I of variable phase position is so shifted during the time in which it is ineffective that it nearly corresponds with the grid alternating potential II of fixed phase position. When this position has been reached, the grid alternating potential I can again be rendered effective. If the section circuit breaker or line switch of the short-circuited section has been switched-off in the meantime, the voltage can be regulated to its normal value by means of the grid alternating potential I of variable phase position.

In Fig. 1 it has been assumed by way of example that the shifting of the phase position of the grid alternating potential I has been completed at the time $t_4$ so that at this moment the grid control alternating potential I which has been ineffective previously thereto can again be rendered effective. The ignition then is controlled by the grid control alternating potential I of variable phase.

The phase position of the grid control alternating potential I is now altered so that the anode $u'$ ignites at the time $t_5$, the anode $w$ at the time $t_6$, and the anode $v'$ at the time $t_7$. As is apparent from Fig. 1, the phase position of the grid control alternating potential I is to be changed during the described procedure in such a manner that the successive anodes are ignited at continuously earlier instants. This adjustment of the phase position of the grid control alternating potential I is continued until the original phase-relation between the two grid control alternating potentials I and II has again been reached and the rectifier operates, therefore, again at its full potential.

In Fig. 2 there is shown a circuit arrangement embodying this invention. The multi-anode rectifier 1 which is provided with the mercury cathode 2 and the anodes 3, 3', 3'' and with the appertaining grids 4, 4', 4'' supplies a continuous-current network in the customary manner. In normal operation the grids are energized through the protective resistance 6 from the transformer 7 with its peaked wave secondary potential curve, and the phase adjuster 8. According to the phase position of the secondary potential of said transformer 8, the anodes are ignited at an earlier or a later instant within one period.

When a short-circuit occurs in the continuous current network, a potential is produced by the change of the continuous current in the transformer 12, and the condenser 11 is charged by that potential across the rectifier 20. The potential appearing across the condenser 11 and the resistance 10 is superposed on the negative biasing grid potential 9 so that the grid control alternating potential produced by the transformer 7 is ineffective for the ignition of the anodes. Instead thereof, the grid control alternating potential having peaked wave shape delivered by the transformer 23 now becomes effective and is impressed through the protective resistance 5 upon the grid 4. By a suitable adjustment of the phase position of the secondary coil of an auxiliary transformer or phase shifter 24 relatively to the phase position of the anode potentials of the rectifier the effective grid potential is such that the anodes ignite at an essentially later time within the period so that the effective continuous potential is considerably lower than the possible maximum continuous potential. The potential produced by the transformer 7 may, in accordance with the explanations given to Fig. 1, be denoted I and the grid control alternating voltage of the transformer 23 may be denoted II.

In order to vary the phase of grid control alternating potential I upon short-circuit conditions, the potential arising in the condenser 11 is utilised to render conductive the grid-controlled gas or vapor discharge valve 13 whereby the relay 15 will be energized. The armature 16 will be attracted with a jerk and will rotate by means of the lever 17 the armature of the rotary regulator 8 by an adjustable angle. This angle may amount, for instance, to 90°. Preferably the angle chosen is large enough so that the phase position of the secondary potential of the transformer 7 is brought nearly in correspondence with the phase position of the secondary potential of the transformer 23.

After this operation the relay interrupts automatically its circuit through the contact 18 and this renders the gas or vapor discharge valve 13 nonconductive. Even if the contact 18 is reclosed the discharge valve 13 conducts current only when its grid is connected up to a potential corresponding with the continuous potential 14.

Simultaneously with the turning of the rotor of the rotary phase shifter 8 by means of the shaft 19 and the lever 17 a return-spring 22 is biased so as to be able to turn the rotor back into its normal position with a speed that is regulable by means of a braking device 21. The phase position of the grid of the rectifier I is, thus, gradually so changed that the anodes ignite continually earlier until, finally, the normal position of the ignition moment is again reached. In order to render the potential produced by the transformer 7 effective at the proper time, the time constant of the circuit formed by the resistance 10 and the condenser 11 should be adjusted so that the potential across the condenser 11 is small relative to the negative biasing potential a short time after the opening of the contact 18.

In this arrangement for the selective switching-off of short-circuits in networks fed by grid-controlled rectifiers the short-circuit current is not limited to a definite value. It rises, in fact, to its full value, if the circuit breaker does not release, but the rate of increase is governed by the adjustment of the braking device.

I claim:

1. An electric valve converting system for transferring energy between two circuits, one of which is an alternating-current circuit comprising an electric valve provided with a control electrode, a control circuit for rendering conductive said valve including means for supplying to said control electrode an alternating potential having a retarded fixed phase relation to the potential of said alternating current circuit and means for simultaneously supplying to said control electrode an alternating potential advanced in phase relative to said first potential, means responsive to abnormal conditions of said system for rendering ineffective said latter potential and retarding the phase thereof sufficiently to limit the output of said valve to a safe value, and means for subsequently rendering effective said latter potential and gradually returning the phase of said latter potential to the original phase relation thereby to gradually increase the output of said valve to the original value.

2. An electric valve converting system for transferring energy between two circuits, one of which is an alternating-current circuit comprising an electric valve provided with a control electrode, a control circuit for said electrode including means for supplying thereto alternating potential impulses having a predetermined fixed retarded phase relation with respect to the potential of said alternating-current circuit and alternating potential impulses advanced in phase with respect to said first mentioned impulses, means responsive to abnormal conditions of said system for retarding the phase of said last mentioned impulses, and means for subsequently advancing the phase of said last mentioned impulses until the original phase relation is obtained.

3. In a protective system for permitting switching off of short-circuited switches in a network fed by a controlled electric valve converting system, the combination comprising a controlled electric valve converting apparatus, a control circuit supplying thereto a non-sinusoidal alternating potential having a fixed phase relation with respect to the anode potential and an alternating potential of similar wave shape having a variable phase relation, means responsive to abnormal current conditions of said apparatus for rendering substantially ineffective said alternating potential of variable phase, means for shifting said last mentioned alternating potential to a position having a phase relation substantially the same as said alternating potential of fixed phase relation, means for permitting said alternating potential of variable phase relation to again become effective, and means for gradually shifting the phase of said alternating potential thereby to gradually increase the power output of said electric valve converting apparatus.

4. The combination comprising a controlled electric valve converting apparatus, a control circuit for supplying thereto a control potential comprising an alternating potential of rectangular wave form having a fixed phase position retarded relative to the anode potential and an alternating potential of rectangular wave form having a variable phase relation, means responsive to abnormal current increases of said apparatus for rendering ineffective said alternating potential of variable phase relation, an means for shifting the phase of said variable phase alternating potential so that upon being subsequently rendered effective the power output of said apparatus will gradually increase.

5. The combination comprising a controlled electric valve converting apparatus, a control circuit including means for supplying thereto an alternating potential of fixed phase relation and means in parallel to said first means for supplying thereto an alternating potential of variable phase relation, and means responsive to abnormal current increases of said apparatus for supplying in series with said alternating potential of variable phase relation a negative bias sufficient to render substantially ineffective said alternating potential.

6. The combination comprising a controlled electric valve converting apparatus, a control circuit for supplying thereto a control potential having a predetermined phase relation and a control potential having a variable phase relation with respect to the anode voltage of said apparatus, and means responsive to a predetermined rate of increase of current through said apparatus for rendering substantially ineffective only said control potential of variable phase relation.

CLAUS FRÖHMER.